United States Patent [19]

Pfeifer et al.

[11] 4,438,164
[45] Mar. 20, 1984

[54] CONTAINERS FOR X-RAY FILMS OR THE LIKE

[75] Inventors: Josef Pfeifer, Unterhaching; Alfred Rheude, Munich, both of Fed. Rep. of Germany

[73] Assignee: Agfa-Gevaert Aktiengesellschaft, Leverkusen, Fed. Rep. of Germany

[21] Appl. No.: 341,193

[22] Filed: Jan. 20, 1982

Related U.S. Application Data

[63] Continuation of Ser. No. 134,925, Mar. 28, 1980, abandoned.

[30] Foreign Application Priority Data

Mar. 30, 1979 [DE] Fed. Rep. of Germany ....... 2912668

[51] Int. Cl.$^3$ .................... G03B 41/16; B32B 15/08; B65D 85/48
[52] U.S. Cl. ..................................... 428/35; 428/332; 428/458; 428/463; 428/900; 428/913; 206/454; 206/455; 206/456; 378/186; 378/187
[58] Field of Search ............... 428/332, 463; 206/454, 206/455, 456

[56] References Cited

U.S. PATENT DOCUMENTS

| | | | |
|---|---|---|---|
| 2,590,891 | 4/1952 | Reuter | 250/480 |
| 2,590,892 | 1/1952 | Reuter | 250/480 |
| 3,359,152 | 12/1967 | Blume, Jr. | 428/900 |
| 3,582,912 | 6/1971 | Valin et al. | 428/900 |
| 3,704,369 | 11/1972 | Paidosh | 250/481 |
| 4,350,248 | 9/1982 | Bauer | 206/455 |

FOREIGN PATENT DOCUMENTS 1221548 8/1966 Fed. Rep. of Germany.

Primary Examiner—P. Ives
Attorney, Agent, or Firm—Kontler, Grimes & Battersby

[57] ABSTRACT

A container for X-ray films is of the type wherein at least one side of the film is contacted by a stratum of fluorescent material. The fluorescent material is biased against the respective side or sides of the film by two layers which consist of ferromagnetic and/or magnetic material, flank the film and attract each other. Such layers can be applied to the inner or outer sides of sheet-like carriers consisting of synthetic plastic material. The aforedescribed film, stratum or strata, layers and carriers may but need not be inserted into the space between the rigid or flexible walls of an envelope. The envelope can be dispensed with if the carriers consist of opaque material. Since each of the two carriers can support the respective layer and the respective stratum of fluorescent material, the thickness of the entire package is minimal and the film can be placed into close proximity of one or more objects to be imaged so as to obtain sharp images of such object or objects. The distance between the film and the object or objects is reduced still further if the layers of ferromagnetic and/or magnetic material are applied to the inner sides of the respective carriers because the distance between the layers is then small and the thickness of such layers can be held to a minimum. The thinnest packages are obtained by mixing the ingredients of the layers with the ingredients of the fluorescent strata and applying to each carrier a single coat of the resulting suspension so that the coat is disposed between the respective carrier and the corresponding side of the film.

22 Claims, 5 Drawing Figures

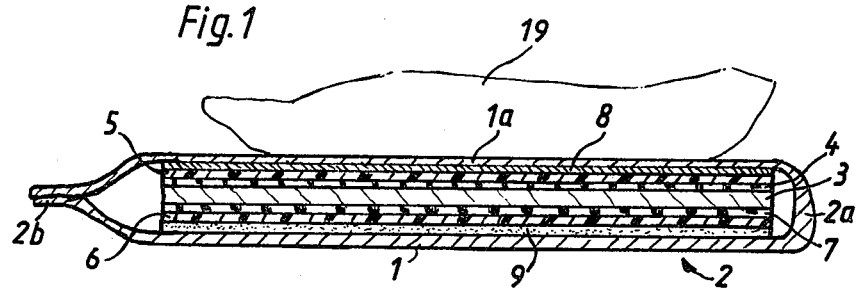
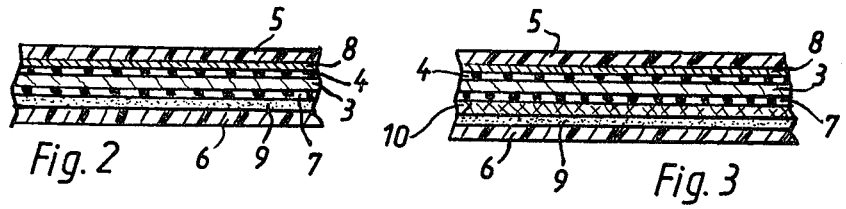
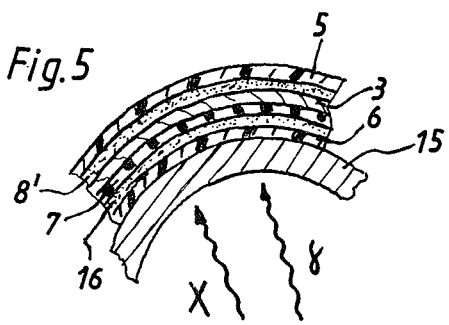

CONTAINERS FOR X-RAY FILMS OR THE LIKE

This application is a continuation of application Ser. No. 134,925, filed Mar. 28, 1980, now abandoned.

BACKGROUND OF THE INVENTION

The present invention relates to containers for radiation-sensitive material, and more particularly to improvements in containers for X-ray films or the like. Still more particularly, the invention relates to improvements in devices for confining sheets or panels of X-ray film or the like between two spaced-apart layers in such a way that the film contacts at least one stratum of fluorescent material.

It is already known to confine a sheet or panel of X-ray film between two rigid or flexible walls which form part of a cassette or an analogous container. A known cassette which has rigid walls and serves for confinement of X-ray film includes intensifying foils which are biased against the film by inserts consisting of foamed synthetic plastic material. Such inserts are applied to the inner side or sides of one or both rigid walls. A cassette with flexible walls is disclosed, for example, in German Auslegeschrift No. 12 21 548, wherein the film and the intensifying foils are confined in a deformable (flexible) envelope or wrapper consisting of a material which is permeable to X-rays. The intensifying foils are caused to bear against the respective sides of the film in response to evacuation of air from the interior of the envelope.

Commonly owned allowed copending application Ser. No. 4,308 filed Jan. 17, 1979 by Walter Bauer discloses means for uniformizing the pressure which the intensifying foils apply to the film. To this end, the container comprises a magnetic plate which cooperates with a second plate consisting of ferromagnetic material. The sandwich including the film and two intensifying foils which flank the film is interposed between the two plates whereby the magnetic plate attracts the ferromagnetic plate and thereby urges the foils against the respective sides of the film. Owing to the provision of numerous layers and carriers for such layers, the distance between the film and the object or objects to be examined is quite pronounced. This reduces the sharpness of the image. Moreover, the magnetic plate must be relatively thick in order to ensure adequate attraction of the ferromagnetic plate. As is known, magnetic attraction between the two plates decreases proportionally with the square of the distance therebetween.

OBJECTS AND SUMMARY OF THE INVENTION

An object of the invention is to provide a novel and improved container for X-ray films or the like wherein the intensifying component or components are adequately biased against the film without affecting the quality of the image.

Another object of the invention is to provide a container of the just outlined character which renders it possible to place the film into close or immediate proximity of the object or objects to be imaged so that the geometric unsharpness of the image or images of such object or objects is much less pronounced than by resorting to conventional containers.

A further object of the invention is to provide novel and improved means for confining X-ray film in a cassette or an analogous container with rigid or flexible walls.

An additional object of the invention is to provide novel and improved means for applying magnetic, ferromagnetic and/or other layers to constituents of containers for X-ray films or the like.

Another object of the invention is to provide novel and improved means for confining X-ray films in containers with rigid walls without resorting to foamed synthetic plastic material or analogous bulky means for biasing intensifying components against the film.

One feature of the invention resides in the provision of a container for a sheet-like film, especially a container wherein the film is inserted between two spaced-apart flexible or rigid walls. The container comprises first and second sheet-like carriers which flank the film, a fluorescent stratum disposed intermediate at least one of the carriers and the film between the carriers (such stratum is preferably secured, either directly or indirectly, to the one carrier), a magnetic first layer provided on the first carrier, and a second layer provided on the second carrier. The two layers attract each other and thereby bias the fluorescent stratum against the respective side of the film.

The area of the first carrier preferably equals or approximates the area of the film. The same preferably holds true for the fluorescent stratum and for the two layers; this ensures that the entire fluorescent stratum is biased against the entire side or surface of the film between the carriers as a result of magnetic attraction between the two layers. The second layer may consist of magnetic or ferromagnetic material.

At least one of the carriers is or may be flexible, and the carriers preferably consist of opaque material if the aforementioned walls are omitted, i.e., if the carriers constitute the walls of the container.

The novel features which are considered as characteristic of the invention are set forth in particular in the appended claims. The improved container itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a sectional view of a container which constitutes a cassette with flexible walls and wherein the film is confined in accordance with a first embodiment of the invention, the outline of a portion of an object to be imaged being indicated by phantom lines;

FIG. 2 is a fragmentary sectional view of a second container, with the walls omitted;

FIG. 3 is a similar fragmentary sectional view of a third container;

FIG. 4 is a similar fragmentary sectional view of a fourth container; and

FIG. 5 is a fragmentary sectional view of a fifth container and of an object which is to be imaged onto X-ray film in the container.

DESCRIPTION OF THE PREFERRED EMBODIMENTS

Referring first to FIG. 1, the object to be X-rayed is indicated at 19. This object is immediately adjacent to or abuts against the outer side of one flexible wall 1a of a container or cassette 2 which comprises a second flexible wall 1. The latter is spaced apart from and is substantially parallel with the flexible wall 1a. The walls 1 and 1a form part of an envelope or wrapper which is or can be permanently sealed along three of its edge portions (including the right-hand edge portion, as viewed in FIG. 1) and is releasably sealed along the fourth (left-hand) edge portion so as to allow for insertion of a sheet of X-ray film 3 into and for removal of such film from the interior of the envelope. For example, the walls 1 and 1a can constitute the major panels of a substantially U-shaped body which has a bight or web at 2a, is closed at those ends which are nearest to and remote from the observer of FIG. 1, and is releasably sealed at 2b.

The film 3 in the envelope of the cassette 2 is flanked by two sheet-like carriers 5 and 6. Those sides or surfaces of the carriers 5 and 6 which face the film 3 are respectively provided with fluorescent strata 4 and 7. The carrier 5 is nearer to the wall 1a, and the carrier 6 is nearer to the wall 1. The outer side of the carrier 5 (i.e., that side which faces away from the film 3 and hence toward the wall 1a) is provided with a layer 8 which, in the embodiment of FIG. 1, consists of ferromagnetic material. That side of the carrier 6 which faces away from the film 3 (i.e., which faces toward the wall 1) is provided with a magnetic layer 9. The just described arrangement of layers 8 and 9 is preferred at this time because the magnetic layer 9 is normally thicker than the ferromagnetic layer 8. Therefore, by placing the ferromagnetic layer 8 between the film 3 and the object 19, the distance between the object to be imaged and the film can be reduced to a value which is less than if the magnetic layer 9 were located between the film 3 and the object 19. The wall 1a (which, too, is quite thin) can be said to constitute an exposure window for penetration of X-rays which issue from a source (not shown) located at a level above the object 19, as viewed in FIG. 1.

The layer 9 attracts the layer 8 so that the fluorescent strata 4 and 7 on the carriers 5 and 6 are biased against the respective sides of the film 3 between the two carriers. Since the carrier 5 is coated at both sides (namely, its inner side is integral with the stratum 4 and its outer side is integral with the ferromagnetic layer 8), there is no need to provide a discrete carrier for the ferromagnetic layer 8 so that the thickness of the upper part of the cassette or container 2 (between the film 3 and the object 19) is reduced accordingly. The thickness of the carrier 5 and/or 6 may be in the range of 0.2–0.3 mm. It is preferred to make these carriers of a suitable synthetic plastic material, e.g., a polyester or triacetate foil.

FIG. 2 shows a portion of a modified container or cassette. The walls 1 and 1a of the cassette have been omitted for the sake of clarity. The carrier 6 is provided with a magnetic layer 9 which is applied to its inner side (namely, to that side which faces the film 3), and the fluorescent stratum 7 is applied to the inner side of the magnetic layer 9, i.e., the latter constitutes the median layer of a three-layer sandwich including the components 6, 9 and 7. The fluorescent stratum 7 abuts directly against the corresponding side of the film 3.

The carrier 5 of FIG. 2 has an inner side which is attached (e.g., bonded) to the ferromagnetic layer 8, and the fluorescent stratum 4 is applied to the inner side of the layer 8 so that it directly contacts the respective side of the film 3. It will be noted that the distance between the layers 8, 9 of FIG. 2 is less than the distance between the corresponding layers in the cassette 2 of FIG. 1. This is due to the fact that, in FIG. 2, the layers 8 and 9 are disposed between the corresponding carriers 5, 6 and the respective sides of the film 3. Therefore, the thickness of the magnetic layer 9 shown in FIG. 2 can be reduced below the thickness of the layer 9 shown in FIG. 1 because the force with which the layer 9 attracts the corresponding layer 8 diminishes with the square of the distance between such layers. The thickness of the ferromagnetic layer 8, too, can be reduced below the thickness of the similarly numbered layer in the cassette 2 of FIG. 1. This is desirable because a thinner ferromagnetic layer absorbs a lower percentage of X-rays which issue from a source located above the structure of FIG. 2. The object or objects to be examined are placed between the source of X-rays and the wall (if any) which is outwardly adjacent to the carrier 5 of FIG. 2.

The structure of FIG. 2 can be modified in a number of ways without departing from the spirit of the invention. For example, the magnetic layer 9 and the adjacent fluorescent stratum 7 of FIG. 2 can be replaced with a single layer or film by mixing magnet elements with elements of fluroescent material, i.e., by forming a homogenous suspension of finely distributed magnetic and fluorescent constituents and by applying a coat or film of such suspension to the inner side of the carrier 6. Analogously, the constituents of the layer 8 and stratum 4 can be mixed and the resulting suspension is then applied to the inner side of the upper carrier 5 of FIG. 2. Such mode of forming the sandwiches which flank the film 3 further reduces the thickness of the container and renders it possible to place the film 3 nearer to the object or objects to be imaged. The constituents of the fluorescent strata 4, 7, magnetic layer 9 and ferromagnetic layer 8 are known and need not be described in detail because the exact composition of such layers and strata forms no part of the present invention.

FIG. 3 illustrates a portion of a third container or cassette which can be used with advantage when the object or objects to be imaged must be exposed to X-rays or analogous rays of high intensity, e.g., in the range and in excess of 150 kV. The construction of the sandwich including the carrier 5, ferromagnetic layer 8 and fluorescent stratum 4 is or can be the same as described in connection with FIG. 2. The sandwich including the carrier 6, layer 9 and stratum 7 comprises a further layer 10 which consists of lead and is interposed between the magnetic layer 9 and fluorescent stratum 7. The thickness of the further layer 10 is preferably in the range of a fraction of one millimeter, e.g., approximately 0.2 mm. When the container including the structure of FIG. 3 is exposed to high-intensity radiation, the quantum output is improved in that the layer 10 releases electrons which excite the material of the fluorescent stratum 7. The film is shown at 3.

The structures which are shown in FIGS. 2 and 3 can be inserted into an envelope of the type shown in FIG. 1, i.e., into an envelope with flexible walls. However, it is clear that such structures (as well as the corresponding parts of the container shown in FIG. 1) can be installed in commercially available envelopes having rigid walls. However, even in such instances, the envelopes or housings with rigid walls can be simplified in that the thickness of the rigid walls can be reduced to a fraction of the thickness of walls in heretofore known cassettes. This is due to the fact that the rigid walls need not exert a pressure upon the film or stata and/or layers or carriers which are installed in the interior of the container since the fluorescent strata are biased against the film by the cooperating plates or layers 9 and 8.

Referring now to FIG. 4, there is shown a portion of a container having a flexible envelope 11 consisting of synthetic plastic material. The envelope 11 is installed in a frame 14 having a slide fastener 13. The frame 14 surrounds a very thin wall or panel 12 which consists of synthetic plastic material. The wall or panel 12 constitutes a carrier for the layer 8 of ferromagnetic material whose inner side abuts directly against the film 3. The wall 6' of the container shown in FIG. 4 constitutes a carrier for the magnetic layer 9 which, in turn, carries the fluorescent stratum 7 which abuts directly against the film 3. It will be noted that the embodiment of FIG. 4 utilizes a single fluorescent stratum 7; this reduces the sensitivity but enhances the resolution. In certain instances, especially when the container is used by physicians, dentists and/or material testing laboratories, the enhanced resolution (by resorting to the container of FIG. 4) is quite desirable and advantageous.

The aforediscussed ferromagnetic layers 8 can be replaced with magnetic layers, i.e., with magnetic layers whose composition is the same as or corresponds to that of the layers 9. In such instances, one side of each magnetic layer is multipolar.

FIG. 5 illustrates a portion of a container which employs magnetic layers both sides of which are multipolar. The reference character 15 denotes an object which is to be imaged onto the film 3. The object 15 is a pipe or tube which is exposed to X-rays or gamma rays issuing from a source located in or extending into the interior of the tubular object. This object consists of ferromagnetic material. The carrier 6 supports a magnetic layer 16 whose polarity is as described above (both sides of this layer have multiple poles). The inner side of the layer 16 faces the film 3 and carries a fluorescent stratum 7 which directly contacts the concave side of the film 3. The carrier 5 is coated with a ferromagnetic layer 8' which directly contacts the convex outer side of the film 3. The ferromagnetic layer 8' can be replaced with a magnetic layer 9 or 16.

The structure of FIG. 5 can be modified by placing the film 3 between two fluorescent strata in a manner as shown in FIG. 1 or 2.

The walls of the improved cassette or container are preferably opaque, i.e., they do not transmit light. One or both walls can be omitted if the carrier or carriers consist of opaque material. In such instances, portions of the carriers can be said to constitute flexible or rigid walls of the respective container. The just discussed modifications can be resorted to if the carriers are located at the outside, e.g., in a manner as shown in FIG. 2 wherein the layers 8, 9 and the strata 4, 7 are located between the inner sides of the carriers 5, 6 and the respective sides of the film 3.

The manner in which an exposed film is withdrawn from the respective envelope and is replaced with an unexposed film is self-evident.

If the ferromagnetic layers are replaced with magnetic layers whose composition is the same as that of the magnetic layers 9, and if one side of each such magnetic layer is to have multiple poles, the magnetic layers can be produced as follows: Magnetizable iron powder is embedded in rubber. To this end, particles of iron are poured into a rubber solution and the particles are magnetized from one side prior to hardening of the solution. This results in a predetermined orientation of the iron particles. One side of the resulting layer then exhibits magnetic properties.

If both sides of the magnetic layers are to have multiple poles, the particles of iron in a rubber solution are magnetized from two sides before the material of the solution sets.

An important advantage of the improved container is that the distance between the film 3 and the object or objects to be imaged can be reduced to a fraction of the distance between an object and the film in a conventional container. This is particularly important when the container is used in apparatus for testing various types of materials because a reduction in the distance between the film and the material to be tested results in sharper images.

As mentioned above, the distance between the film and the object or objects can be reduced as a result of a reduction in the number of carriers for the various layers, strata, etc. Additional reduction of the distance between the film and the object or objects to be tested or otherwise examined can be achieved in a manner as described in connection with FIG. 2, i.e., by placing the layers between the film and the respective carriers so that the thickness of the layers can be reduced owing to a reduction in the distance therebetween.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A container for a sheet-like film, particularly a container wherein a film is inserted between two spaced-apart walls, comprising carrier means consisting essentially of two sheet-like carriers flanking the film; a fluorescent stratum mounted on at least one of said carriers and disposed intermediate said one carrier and the film between said carriers; a magnetic first layer mounted on a first one of said carriers; and a second layer mounted on a second one of said carriers, said layers attracting one another so that said stratum is biased against the film.

2. The container of claim 1 for a sheet-like film having a predetermined area, wherein the area of said first carrier at least approximates said predetermined area.

3. The container of claim 1, wherein at least one of said carriers is flexible.

4. The container of claim 1, wherein said second layer is a ferromagnetic layer.

5. The container of claim 1, further comprising a second fluorescent stratum disposed between the other of said carriers and the film.

6. The container of claim 1, wherein said one carrier is said first carrier and has a first and a second side, said first layer being applied to one of said sides and said fluorescent stratum being applied to the other of said sides.

7. The container of claim 6, wherein said second carrier has a first side and a second side and said second layer is applied to one side of said second carrier; and further comprising a second fluorescent stratum applied to the other side of said second carrier.

8. The container of claim 7, wherein said other sides of said carriers face the film therebetween.

9. The container of claim 1, wherein each of said carriers has a side facing the film therebetween, said layers being applied to said sides of said carriers and said stratum being applied to the respective layer intermediate such layer and the film between said carriers; and further comprising a second fluorescent stratum disposed between the other layer and the film.

10. The container of claim 9, wherein one of said layers is a ferromagnetic layer.

11. The container of claim 1, wherein said first layer is integral with said fluorescent stratum; and further comprising a second fluorescent stratum integral with said second layer.

12. The container of claim 11, wherein the constituents of said layers and the respective fluorescent strata are intermixed with each other and form homogeneous films at those sides of the respective carriers which face the film therebetween.

13. The container of claim 1, further comprising a lead layer, said lead layer being interposed between said fluorescent stratum and said first layer.

14. The container of claim 1, wherein one of said layers is multipolar on one side thereof.

15. The container of claim 1, wherein at least one of said layers is multipolar on two sides thereof.

16. The container of claim 1, wherein at least one of said carriers consists of synthetic plastic material.

17. The container of claim 16, wherein said synthetic plastic material is selected from the group consisting of triacetate and polyester.

18. The container of claim 1, wherein one of said carriers has a thickness of 0.2–0.3 mm.

19. The container of claim 1, wherein at least one of said carriers is opaque.

20. The container of claim 1, wherein said stratum and said layers are integral with the respective carriers.

21. The container of claim 1, wherein at least one of said walls is rigid.

22. The container of claim 1, wherein at least one of said walls is flexible.

* * * * *